(12) United States Patent
Carbonare

(10) Patent No.: US 7,087,539 B2
(45) Date of Patent: Aug. 8, 2006

(54) STITCHLESS SEAM ADHESIVE TAPE

(76) Inventor: Michael Carbonare, P.O. Box 483, Pompton Plains, NJ (US) 07444

( * ) Notice: Subject to any disclaimer, the term of this patent is extended or adjusted under 35 U.S.C. 154(b) by 18 days.

(21) Appl. No.: 10/253,400

(22) Filed: Sep. 24, 2002

(65) Prior Publication Data
US 2003/0087090 A1 May 8, 2003

Related U.S. Application Data

(60) Provisional application No. 60/324,646, filed on Sep. 25, 2001.

(51) Int. Cl.
B65H 69/02 (2006.01)
B32B 31/20 (2006.01)

(52) U.S. Cl. ............... 442/150; 442/149; 442/151; 428/354; 428/343

(58) Field of Classification Search ............ 442/149, 442/150, 151; 428/354, 343
See application file for complete search history.

(56) References Cited

U.S. PATENT DOCUMENTS

| 4,091,150 A | 5/1978 | Roelofs ............... 428/57 |
| 4,093,492 A | 6/1978 | Raabe et al. ............ 156/331 |
| 4,094,721 A | 6/1978 | Sturm et al. ............ 156/309 |
| 4,310,373 A | 1/1982 | Schuhmacher et al. .. 156/308.2 |
| 4,410,575 A | 10/1983 | Obayashi et al. .......... 428/57 |
| 4,636,427 A * | 1/1987 | Ohno et al. ............ 428/246 |
| 4,669,824 A | 6/1987 | Wallace ............... 350/321 |
| 4,699,824 A * | 10/1987 | Pufahl ............... 428/220 |
| 4,740,416 A | 4/1988 | DeCoste, Jr. et al. ...... 428/240 |
| 5,368,923 A | 11/1994 | Tippett ............... 428/238 |
| 6,060,408 A | 5/2000 | Monica ............... 442/65 |
| 2003/0087090 A1 * | 5/2003 | Carbonare ............ 428/343 |

* cited by examiner

Primary Examiner—Daniel Zirker
(74) Attorney, Agent, or Firm—Grossman, Tucker, Perreault & Pfleger, PLLC

(57) ABSTRACT

A laminate construction for splicing textile materials together comprising a first layer of heat activated adhesive having a melting point $T_1$ and a second layer of heat activated material having a melting point $T_2$. A support layer is located between the first layer and the second layer, and the support layer has a melting point $T_3$ which is higher than $T_1$ and $T_2$.

18 Claims, 1 Drawing Sheet

STITCHLESS SEAM ADHESIVE TAPE

CROSS REFERENCE TO RELATED APPLICATION

This application claims priority to U.S. provisional patent application Ser. No. 60/324,646, filed on Sep. 25, 2001.

FIELD OF THE INVENTION

This invention relates to heat activated thermoplastic adhesive films used primarily in tape form as a lap splice to bond textiles together. In particular, the tape is a laminate construction comprised of three or more layers with a central supporting layer having a higher melting point than the surrounding layers.

BACKGROUND OF THE INVENTION

Textiles are used in web or sheet form to cover and protect a large variety of items. In the construction of such items as awnings, convertible tops for motor vehicles, garments, geotextiles and tents, it is common to sew or stitch sections together to form larger sheets.

Tarpaulins are used in marine, military and recreation (circuses, picnics and the like) applications and in transportation (truck, train, freight covers) many of which are formed by splicing together roll goods of textiles resulting in many seams due to the large areas involved.

A disadvantage of stitched or sewn seams is that they can leak and over time the stitches can deteriorate and fail.

Further, many of these textiles are handled as roll goods and it is important to be able to splice textiles together on the fly in an automated process at high machine operating speeds without the bond severing or breaking.

A number of patents deal with the splicing of sheet materials together.

U.S. Pat. No. 4,699,824 to Pufahl discloses a pressure sensitive adhesive tape of particular utility as a flying slice; composed of a frangible substrate formed of a ply of a cured thermoset resinous aldehyde condensate (or fibrous cellulose web impregnated with said condensate) and an elastomeric pressure sensitive adhesive (PSA) on at least one side of the substrate.

U.S. Pat. No. 4,410,575 to Obayashi recites a lap welding method for textile fabrics wherein a piece of synthetic bonding tape is interposed between the superposed two end portions and a high frequency wave treatment is applied (or heat) and pressure to melt the tape. Claim 1 specifically recites "wherein at least one side edge portion of said interposed bonding tape extends outwardly over a corresponding edge of one of said end portions . . . and remains unmelted." This is to prevent edge peeling. Said bonding tape (claim 6) consists essentially of at least one member selected from the group of polyvinyl chlorides, polyurethanes, polyesters, polyamides, vinyl chloride-vinyl acetate copolymers, and ethylene-vinyl acetate copolymers.

U.S. Pat. No. 4,094,721 to Sturm recites the use of a linear saturated crystalline polyester (of specific moieties) useful in securing textile substance to a substrate. Claim 17 recites "In a process for securing one substrate to another by disposing between said substrates a heat fusible material and maintaining the substrates in sufficient juxtaposition until said material has fused and bond one of said substrates to the other, the improvement which comprises employing a heat fusible material of the polyester in claim 1."

U.S. Pat. No. 4,093,492 to Raabe claims "a process for heat-sealing together surfaces of materials comprising applying to at least one of the surfaces to be sealed a composition comprising a copolyamide having a melting range below about 110° C." and a specific chemical structure.

U.S. Pat. No. 4,310,373 to Schuhmacher relates to a method of heat sealing the opposing surfaces of planar textile materials which comprises applying a heat-seal adhesive to at least one of the opposing surfaces, and then pressing them together under heat and pressure. The heat-seal adhesive employed is a low melting polyurethane of specific molecular weight. The adhesive is in the form of a spun-bonded fabric.

U.S. Pat. No. 5,368,923 to Tippett recites the use of a bonding interlayer which includes a non-fluoro plastic carrier element coated with a fluoroplastic which melts under heat and pressure.

U.S. Pat. No. 6,060,408 to Monica discloses a double sided adhesive element for securing an article of clothing comprising a flexible support member having a first side coated with an adhesive and a second side coated with an adhesive, said support member comprising cloth, and said adhesive an acrylic adhesive.

U.S. Pat. No. 4,740,416 to DeCoste, Jr. discloses novel adhesive tapes consisting of a layer comprising glass or resin microspheres disposed in a polymer matrix, a cloth screen or reinforcing fabric and a layer of adhesive, preferably a PSA. These products are useful as duct tapes.

U.S. Pat. No. 4,091,150 to Roelofs discloses a splicing tape for abutted ends formed of an adhesively coated support film which comprises a biaxially oriented, heat set, co-extruded laminate formed from a layer of crystalline polyester material and a layer of less crystalline polyester material, with the thermosetting adhesive coating the surface of the latter layer. The support film is preferably PEN, PCDT or PET.

However, each of these references is directed to a specific bonding process or chemical polymer type.

SUMMARY OF THE INVENTION

It is the object of the present invention to overcome the limitations of prior splicing tapes by providing a laminate construction in the form of a heat activated tape that is capable of being automatically processed on high speed equipment to form splices for textile materials. Further, the tape can be chemically configured to be adhesively compatible with a variety of textile substrate materials and physically configured to have a thickness and construction that is compatible with the thickness and weave of the textile substrates being bonded. It is a further object of this invention to provide a laminate construction in the form of a heat activated tape that can be processed using a variety of sources of heat and pressure. In particular this tape offers significant improvement over stitched or sewn seams by providing faster splicing speeds, improved splice bond strength, and the elimination of seam leaks and stitch rot with deterioration as stitches and holes would no longer be present.

According to the invention, these objects are achieved by providing heat activated thermoplastic adhesives having a laminate construction of three or more layers, which can be applied by such processing methods as hot air welding, hot wedge welding, radio frequency welding and the like. This construction is comprised of an adhesive layer, a supporting layer and a second adhesive layer, wherein the supporting layer comprises a fabric, mesh or film having a higher melting point than the surrounding adhesive layers. The adhesive layers can be made from a variety of polymers and coating processes and can be in any combination that is compatible with the substrates being bonded. Additionally, layers of pressure sensitive adhesive can be applied to either or both of the aforementioned heat activated thermoplastic adhesive layers to provide a tacky surface to assist in the bonding process.

In broad embodiment, therefore, the present invention comprises a laminate construction-for splicing textile materials together comprising a first layer of heat activated adhesive having a melting point $T_1$, a second layer of heat activated adhesive having a melting point $T_2$, and a support layer located between said first layer and said second layer, said support layer having a melting point $T_3$ higher than $T_1$ and $T_2$.

BRIEF DESCRIPTION OF THE DRAWINGS

These and other objects, features and advantages of the invention will become apparent upon consideration of the description of this invention and the appended drawings in which.

The above and other objects, features and advantages of the present invention will be apparent in the following detailed description thereof when read in conjunction with the appended drawings wherein the same reference characters denote the same or similar paths throughout the several views.

DESCRIPTION OF THE PREFERRED EMBODIMENTS

Figure 1:
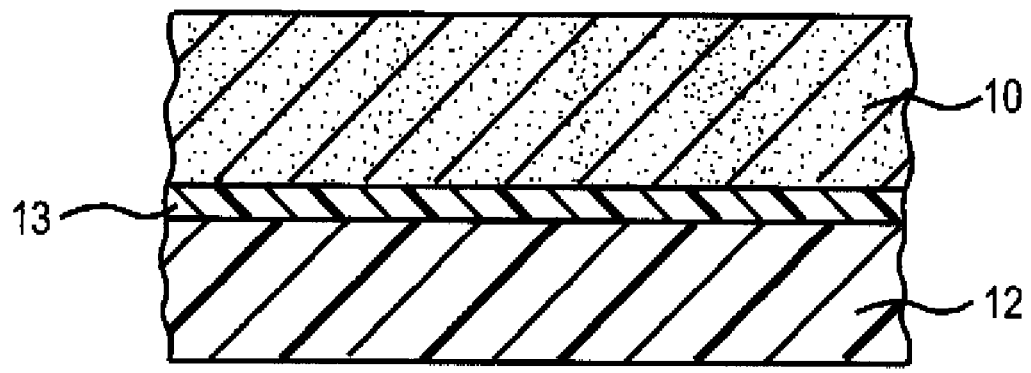
FIG. 1 shows a cross-sectional view of the laminate construction of the invention.

For elements common to the various embodiments of the invention, the numerical reference character between the embodiments is held constant, but distinguished by the addition of an alphanumeric character to the existing numerical reference character. In other words, for example, an element referenced at 10 in the first embodiment is correspondingly referenced at 11A, 10B, and so forth in subsequent embodiments. Thus, where an embodiment description uses a reference character to refer to an element, the reference character applies equally, as distinguished by alpha-numeric character, to the other embodiments where the element is common.

Referring now to the figures, FIG. 1 shows a typical three layer laminate construction of the present invention comprising a top adhesive layer 10 and bottom adhesive layer 12 and a supporting material 13 of fabric, mesh, film or the like which has a higher melting point than either adhesive layer 10 or 12. The adhesive layers can be slot die, blow extruded or solution coated films made from polyamide, polyester, polyethylene, polyurethane or any combination of these polymers which are compatible with the textiles to be bonded. The adhesive layer thickness used is determined by the thickness and weave of the textiles to be bonded but typically the adhesive layers will preferably be in the range of 0.001"–0.015" in thickness.

The supporting layer 13 is the central layer between the adhesive layers 10, 12 and comprises a fabric (woven or non-woven), mesh or film which has a higher melting point characteristic such that it does not melt as fast as the original adhesive layers as the central layer between the two adhesive layers.

The laminate is designed in this manner to prevent it from severing or breaking (and promote faster running speeds) in the automated feeding processes used to deliver the adhesive in tape form to the point where it will be activated (between the two textiles).

The tapes of this invention an be applied by a number of processes known to those skilled in the art such as:

Hot air welding—the tape (preferably 0.25"–2" in width) is fed from a roll between two layers of textiles. The textiles are aligned with the tape along the outer edges to splice the textiles edge to edge—with an overlap area equal to the width of the tape. The hot air welding process activates the adhesive with jets of hot air directed onto the surfaces of the tape (one jet is directed on the top surface of the tape and the other is directed on the bottom surface) and uses pinch rollers to press together the textiles and activated adhesive to create an intimate bond.

Hot wedge welding—a tape (preferably 0.25"–2" width) is fed from a roll between two layers of textiles. The textiles are aligned with the tape along the outer edges to splice the textiles edge to edge—with an overlap area equal to the width of the tape. The hot wedge welding process utilizes a heated metallic tool (wedge) over which the tape is fed. The other side of the wedge is in contact with the textile which serves to heat both surfaces and accelerate the bonding process. As in the hot air welding process, the hot wedge welding process also uses pinch rollers to apply pressure to the bonded area as the adhesive is activated.

RF (radio frequency) welding—a tape (preferably 0.25"–2" width) is fed from a roll between two layers of textiles. The textiles are aligned with the tape along the outer edges to splice the textiles edge to edge with an overlap area equal to the width of the tape. The RF welding process activates the adhesive using radio frequency energy. The tool used activates the adhesive as it applies pressure. It can either be a continuous process with an active tool or a reciprocating process in a press where the bond is created when the RF cycle is engaged after the seams and tape are aligned in the tool.

Figure 2:
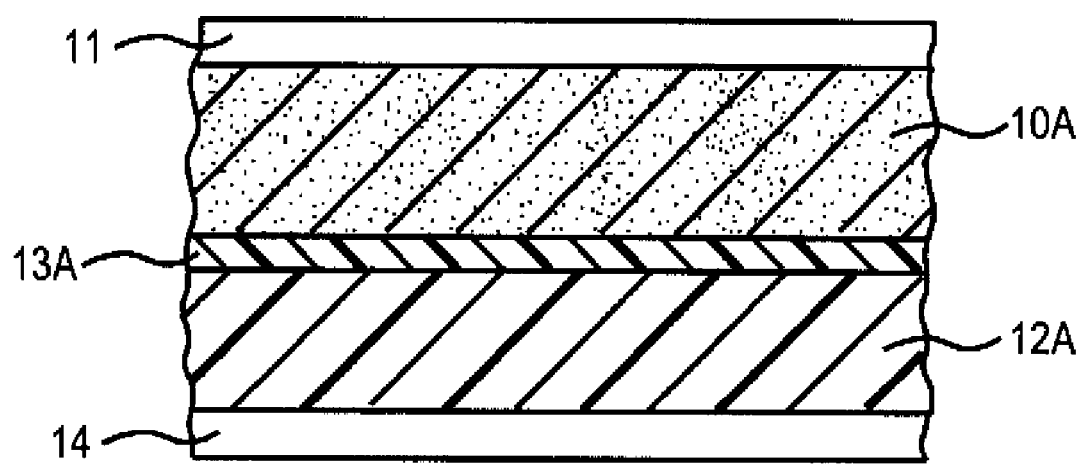
FIG. 2 shows an alternate laminate construction having pressure sensitive adhesive layers applied to aid in processing.

FIG. 2 shows an alternative laminate construction having pressure sensitive adhesive (PSA) layers 11, 14 applied to the top 10A and/or bottom 12A adhesive layers to provide a tacky surface to the tape to assist in locating the tape in the area of the splice. Since the top 10A and bottom 12A adhesive layers are dry at room temperature, pre-applying PSA prior to final bonding of the textile substrates together allows the tape to maintain its position through the high speed automated feeding process of the tape into the splice.

Thus, it can be seen that the invention provides a new and improved laminate construction of heat activated adhesives which can function as a bonding adhesive using a variety of heat and pressure processes to replace, stitched seams in the construction of tarpaulins, awnings, and the like where splicing of textile materials is involved.

The description and drawings illustratively set forth our presently preferred invention embodiments. We intend the description and drawings to describe these embodiments and not to limit the scope of the invention. Those skilled in the art will appreciate that still other modifications and variations of the present invention are possible in light of the above teaching while remaining within the scope of the following claims. Therefore, within the scope of the claims, one may practice the invention otherwise than as the description and drawings specifically show and describe.

What is claimed is:

1. A method for splicing textile materials together comprising:
   providing a first textile layer and a second textile layer;
   providing a laminate construction including a support layer having a first surface and an opposing second surface, and having a melting point of $T_3$, a first heat activated adhesive layer having a melting point of $T_1$ laminated on said first surface of said support layer, and a second heat activated adhesive layer having a melting point of $T_2$ laminated on said opposing second surface of said support layer, wherein $T_3 > T_1$ and $T_3 > T_2$;
   positioning said laminate construction between and in direct contact with said first textile layer and said second textile layer;
   generating heat to activate said first heat activated adhesive layer and said second heat activated adhesive layer; and
   bonding said laminate construction to said first textile layer and said second textile layer.

2. The method of claim 1 wherein said support layer is a fabric.

3. The method of claim 1 wherein said support layer is a mesh.

4. The method of claim 1 wherein said support layer is a film.

5. The method of claim 1, wherein said step of generating heat comprises a welding method selected from the group consisting of hot air welding and hot wedge welding.

6. The method of claim 1, wherein said step of generating heat comprises radio frequency welding.

7. The method of claim 1, further comprising applying pressure at the site of bonding.

8. The method of claim 1, wherein said first adhesive layer and said second adhesive layer are selected from the group consisting of polyamide, polyester, polyethylene, polyurethane or any combination thereof.

9. The method of claim 1, wherein said laminate construction comprises a width W; and said first textile layer and said second textile layer
   overlap by at least said width W.

10. A method for splicing textile materials together comprising:
    providing a first textile layer and a second textile layer;
    providing a laminate construction including a support layer having a first surface and an opposing second surface, and, having a melting point of $T_3$, a first heat activated adhesive layer having a melting point of $T_1$ laminated on said first surface of said support layer, and a second heat activated adhesive layer having a melting point of $T_2$ laminated on said opposing second surface of said support layer, wherein $T_3 > T_1$ and $T_3 > T_2$;
    applying a layer of pressure sensitive adhesive on an outer surface of said laminate construction;
    positioning said laminate construction with said layer of pressure sensitive adhesive between and in direct contact with said first textile layer and said second textile layer;
    generating heat to activate said first heat activated adhesive layer and said second heat activated adhesive layer; and
    bonding said laminate construction to said first textile layer and said second textile layer.

11. The method of claim 10 wherein said support layer is a fabric.

12. The method of claim 10 wherein said support layer is a mesh.

13. The method of claim 10 wherein said support layer is a film.

14. The method of claim 10, wherein said step of generating heat comprises a welding method selected from the group consisting of hot air welding and hot wedge welding.

15. The method of claim 10, wherein said step of generating heat comprises radio frequency welding.

16. The method of claim 10, further comprising applying pressure at the site of bonding.

17. The method of claim 10, wherein said first adhesive layer and said second adhesive layer are selected from the group consisting of polyamide, polyester, polyethylene, polyurethane or any combination thereof.

18. The method of claim 10, wherein said laminate construction comprises a width W; and said first textile layer and said second textile layer overlap by at least said width W.

* * * * *